US010972816B2

(12) United States Patent
Rahman et al.

(10) Patent No.: US 10,972,816 B2
(45) Date of Patent: Apr. 6, 2021

(54) METHODS, SYSTEMS AND COMPUTER PROGRAMS FOR ENABLING DEEP FIBER ACCESS TO A SOFTWARE DEFINED NETWORK

(71) Applicant: AT&T Intellectual Property I, L.P., Atlanta, GA (US)

(72) Inventors: Moshiur Rahman, Marlboro, NJ (US); Barnali Chatterjee, Mendham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/428,174

(22) Filed: May 31, 2019

(65) Prior Publication Data

US 2020/0382852 A1  Dec. 3, 2020

(51) Int. Cl.
*H04B 10/00* (2013.01)
*H04Q 11/00* (2006.01)
*H04L 12/24* (2006.01)
*H04L 12/28* (2006.01)

(52) U.S. Cl.
CPC ..... *H04Q 11/0067* (2013.01); *H04L 12/2801* (2013.01); *H04L 41/046* (2013.01); *H04Q 2011/0084* (2013.01); *H04Q 2213/13012* (2013.01); *H04Q 2213/13209* (2013.01); *H04Q 2213/13516* (2013.01)

(58) Field of Classification Search
CPC ..... H04Q 2213/13012; H04Q 11/0067; H04Q 2011/0084; H04Q 2213/13209; H04Q 2213/13516; H04Q 2011/0081; H04L 12/2801; H04L 41/046; H04B 10/2575; H04B 10/0795

USPC ............ 398/115, 116, 117, 10, 1, 25, 17
See application file for complete search history.

(56) References Cited

U.S. PATENT DOCUMENTS

| 9,622,135 | B1 * | 4/2017 | Voruganti | H04W 36/24 |
| 2004/0031059 | A1 * | 2/2004 | Bialk | H04L 41/0856 725/129 |
| 2006/0253883 | A1 * | 11/2006 | Giammaressi | H04N 7/17318 725/95 |
| 2010/0150120 | A1 * | 6/2010 | Schlicht | H04W 4/23 370/338 |
| 2010/0322390 | A1 * | 12/2010 | Bialk | H04L 41/065 379/32.04 |

(Continued)

*Primary Examiner* — Hibret A Woldekidan
(74) *Attorney, Agent, or Firm* — BakerHostetler

(57) ABSTRACT

A system for enabling deep fiber access to a software defined network includes a hybrid fiber coaxial (HFC) network, a software defined network (SDN) control agent disposed in the HFC network and a core network. The core network includes an IP backbone and an SDN. The SDN control agent receives a notification of a quality of service (QoS) degradation event and the accesses local table rules stored in the SDN control agent to determine whether the local table rules identify an action to implement in response to the notification. When the local table rules identify the control agent action to take in response to the notification implementing the action. When the local table rules do not identify the action to be implemented by the SDN control agent in response to the notification, then the SDN control agent accesses the SDN controller to determine whether the SDN controller can identify a controller action to take in response to the notification.

17 Claims, 2 Drawing Sheets

(56) References Cited

U.S. PATENT DOCUMENTS

| | | | |
|---|---|---|---|
| 2016/0087756 A1* | 3/2016 | Chapman | H04L 27/12 |
| | | | 714/776 |
| 2019/0098067 A1* | 3/2019 | Sandoval | H04L 12/12 |
| 2019/0109638 A1* | 4/2019 | Yilmaz | H04L 45/64 |
| 2020/0067851 A1* | 2/2020 | Yigit | H04L 45/306 |

* cited by examiner

METHODS, SYSTEMS AND COMPUTER PROGRAMS FOR ENABLING DEEP FIBER ACCESS TO A SOFTWARE DEFINED NETWORK

TECHNICAL FIELD

The present disclosure relates to communications over hybrid fiber coaxial (HFC) networks. More particularly, the disclosure relates to a method, system, and computer program for enabling deep fiber access to a software defined network.

BACKGROUND

Wireless technologies continue to evolve with significant advances from 3G, to 4G, and 4G LTE and now 5G. 3G introduced Web browsing, email, video downloading, picture sharing and other Smartphone technology. 4G and 4G LTE improved the data-transmission speeds of the network. 5G promises significantly faster data rates, higher connection density, much lower latency, and energy savings, among other improvements. 5G networks are digital networks where analog signals representing sounds and images are digitized in the phone, converted and transmitted as bits. Like other cellular networks, 5G networks use a system of cell sites that divide their territory into sectors and send encoded data through radio waves. Each cell site must be connected to a network backbone, whether through a wired or wireless backhaul connection. 5G networks need to manage more, smaller cells that can change size and shape and thus require the network to be smarter. 5G networks will have far higher speeds available, and far higher capacity per sector, at far lower latency than 4G. Increased speed and capacity from 5G will rely more heavily on the use of higher frequencies and densification.

Wireless networks must provide predictable and measurable voice, video and delay-sensitive data transmission services. Organizations use the concept of quality of service (QoS) to satisfy service requirements, such as real-time voice and video, and to prevent quality degradation caused by packet loss, delay and jitter. Measure QoS parameters include packet loss, jitter, latency, and bandwidth, among other. Packet loss occurs when routers and switches start dropping packets because congested network links. Packet loss may result in jitter and gaps in speech in voice or video calls. Jitter results from network congestion, timing drift and route changes and may lead to degraded voice and video communications. Latency refers to the time it takes for a packet to travel from a source to a destination. High latency may result in echo and overlapping audio. Bandwidth refers to the maximum amount of data that can be transmitted via a network communication link over a certain period of time. Bandwidth relates to the capacity of the network's communications link to carry data from one node to another.

Densification refers to the addition of cell sites within a particular area, or the deployment of cell sites with higher capacity. Densification is necessary keep up with the increase in mobile data traffic demand. Densification enables more overall users, lower latency, better mobile device battery life, and expanded coverage. The approach is to basically reuse the same spectrum, by keeping the coverage area small and manage the interference between cells. To enhance QoS, network providers are delivering higher capacity to smaller groups of homes and pushing fiber closer to the edge of the network. Fiber densification, the ability to pack as much capacity as possible over the limited fiber resources is a key objective of network providers. Deploying fiber closer to the customers enables efficient transport of increased wireless traffic from that densification. The HFC deep fiber densification enables wider wireless access, such as 5G, access, but with little local HFC's intelligence.

HFC refers to a broadband network that combines optical fiber and coaxial cable. In an HFC cable system used by cable television operators, the traffic is sent from a headend, to a local node through optical fiber. At the local node an IP POP optical node converts the signal from a light beam to radio frequency (RF), and sends it over coaxial cable lines for distribution to subscriber residences. The HFC plant has a long useful life and is capable of significant amounts of bandwidth, but is limited by: silicon availability; linearity of amplifiers; frequency response of the cable itself; and many more constraints not specific to cable but common among outside plant deployments of broadband technologies.

Software-Defined Networking (SDN) is an emerging architecture that is dynamic, manageable, cost-effective, and adaptable, making it suitable for high-bandwidth applications. This architecture decouples the network control and forwarding functions. In an SDN, network control is directly programmable. SDN allows the abstraction of control from forwarding and allows network operators to dynamically adjust traffic flow. In SDN software-based SDN controllers maintain a global view of the network, and appear to applications and policy engines as a single, logical switch. SDN allows network operators to configure and manage network resources quickly via dynamic, automated SDN programs that do not depend on proprietary software. Deep SDN is a method of controlling packet forwarding behavior. With Deep SDN, policy routing can be accomplished without complex combinations of protocols. The logically centralized SDN controller sees the entire network topology and make smarter decisions about the paths to use for each traffic type.

There is a need to optimize the entire network to meet the capacity demands of the users There is a need to facilitate a deep SDN architecture to achieve real time low latency and efficient services. There is a need to provide a reduction in failure reaction time. There is a need to take advantage of deep fiber densification to off load HFC traffic whenever needed under the guidance of deep SDN.

SUMMARY

One general aspect includes a method that receives, at an SDN control agent disposed in a hybrid fiber coaxial (HFC) network, a notification of a quality of service (QoS) degradation event. The method accesses local table rules stored in the SDN control agent to determine whether the local table rules identify a control agent action to take in response to the notification. If the local table rules identify the control agent action to take in response to the notification, then taking the control agent action, and if the local table rules do not identify the control agent action to take in response to the notification, then accessing an SDN controller to determine whether the SDN controller identifies a controller action to take in response to the notification; and when the SDN controller identifies a controller action to take, receiving instruction to implement the controller action.

Implementations may include one or more of the following features. The method further including redirecting traffic through the HFC network to a radio access network using Wi-Fi. The method where accessing the SDN controller includes accessing the SDN controller through an IP POP optical node. The method where the QoS degradation event is bandwidth starvation or packet loss. The method where the SDN controller is disposed in an SDN network in a core network. The method where the SDN remote control agent resides in a network element disposed in the HFC network.

One general aspect includes a system including an HFC network, an SDN control agent disposed in the HFC network and a core network. The core network includes an IP backbone, and an SDN having an SDN controller. The system further includes memory for storing computer instructions coupled to an SDN control agent, where the SDN control agent, responsive to executing the computer instructions, performs operations including receiving, at the SDN control agent a notification of a QoS degradation event, accessing local table rules stored in the SDN control agent to determine whether the local table rules identify a control agent action to take in response to the notification. If the local table rules identify the control agent action to take in response to the notification, then the operations performed by the SDN control agent include taking the control agent action. If the local table rules do not identify the control agent action to take in response to the notification, then then the operations performed by the SDN control agent include accessing the SDN controller to determine whether the SDN controller identifies a controller action to take in response to the notification. The operations performed by the SDN control agent include implementing the controller action when the SDN controller identifies a controller action to take.

Other aspects include a system that further includes the SDN control agent, responsive to executing the computer instructions, performing the operation of redirecting traffic through the HFC network to a radio access network using Wi-Fi. Another aspect is a system where accessing the SDN controller includes accessing the SDN controller through an IP POP optical node. Other aspects include a system where the QoS degradation event is bandwidth starvation or packet loss. Implementations may include the system where the SDN controller is disposed in an SDN in a core network and the system where the SDN control agent resides in a network element disposed in the HFC network.

One general aspect includes a non-transitory, tangible computer-readable medium having computer-executable instructions stored thereon which, when executed by a computer, cause the computer to perform a method. The method implemented includes receiving, at an SDN control agent disposed in a HFC network, a notification of a QoS degradation event and accessing local table rules stored in the SDN control agent to determine whether the local table rules identify a control agent action to take in response to the notification. If the local table rules identify the control agent action to take in response to the notification, then the method takes the control agent action. If the local table rules do not identify the control agent action to take in response to the notification, then the method accesses an SDN controller to determine whether the SDN controller identifies a controller action to take in response to the notification. The method implemented then includes receiving instruction to implement the controller action when the SDN controller identifies a controller action to take.

Implementations may include one or more of the following features. The non-transitory, tangible computer-readable medium where the method performed by the computer-executable instructions further includes redirecting traffic through the HFC network to a radio access network using Wi-Fi. The non-transitory, tangible computer-readable medium where accessing the SDN controller includes accessing the SDN controller through an IP POP optical node. The non-transitory, tangible computer-readable medium where the QoS degradation event is bandwidth starvation or packet loss.

DETAILED DESCRIPTION OF ILLUSTRATIVE EMBODIMENTS

Figure 1:
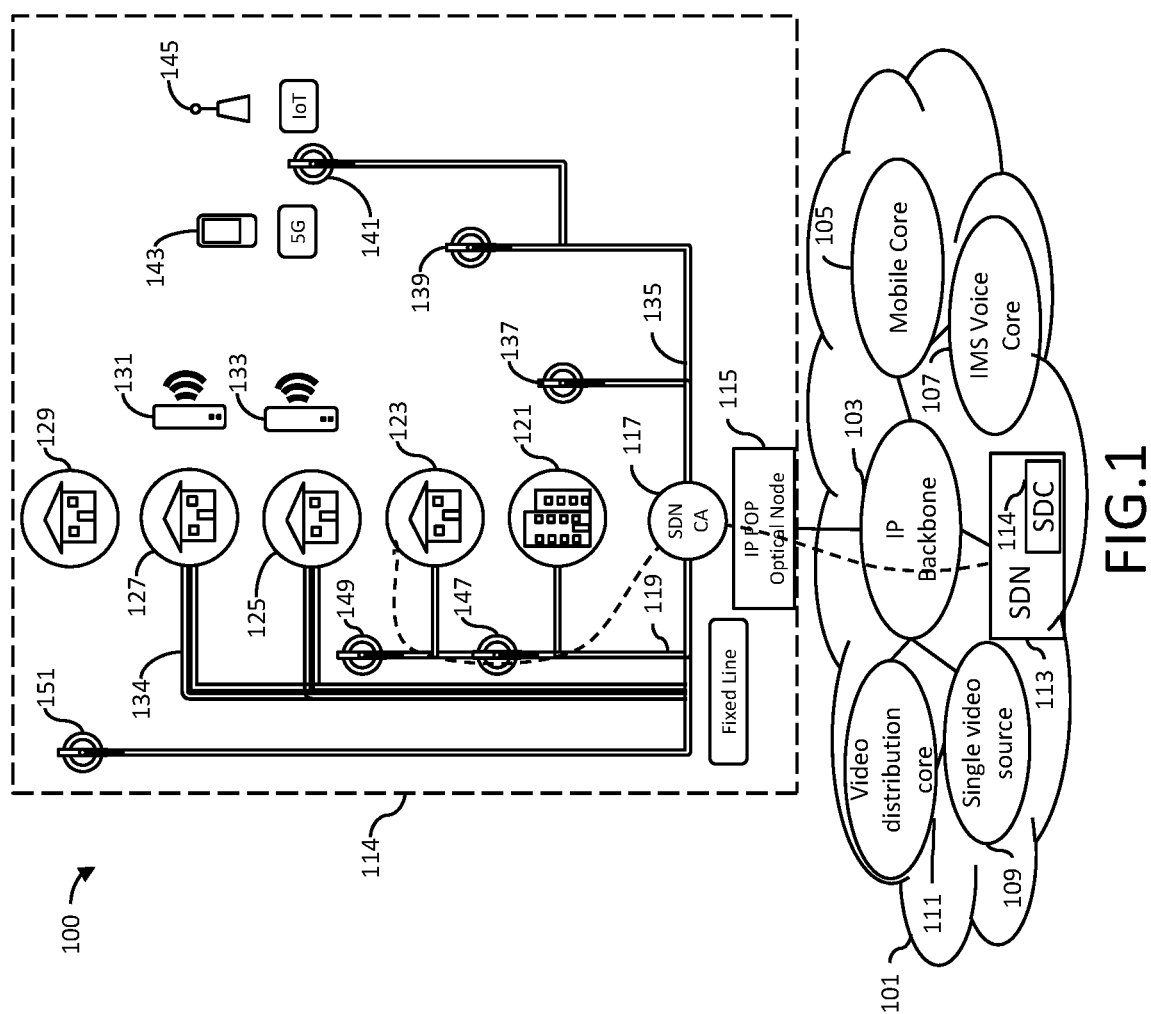
FIG. 1 is a block diagram of an architecture of a core cloud with an SDN and an HFC network with an SDN control agent.

Illustrated in FIG. 1 is a block diagram of an embodiment of an architecture for enabling deep fiber access to a software defined network. The architecture 100 includes a core cloud 101 having an IP backbone 103, a mobile core 105, and IMS voice core 107 a single video source 109 and a video distribution core 111. Core cloud 101 also includes SDN 113 having an SDN controller 114.

The IP backbone 103 consists of routers connected by links with the topological state maintained by an interior gateway protocol (IGP) such as OSPF, combined with a suitable method to set the link weights. Each router is configured with multicast capability and a multicast tree is generated such that each multimedia destination (MD) receives only one copy of the IP packet from the server at the multimedia source (MS) (often called a Head End). The multimedia destination also consists of backbone routers and servers that receive multimedia programs and feed customers in specific serving area.

The mobile core 105 controls mobile network services. Mobile core network 105 provides session management, mobility management, and transport services between a backhaul network and broadband network to support access, by mobile devices, to a packet data network and services of protected resources. A mobile core network 105 may comprise, for instance, a general packet radio service (GPRS) core packet-switched network, a GPRS core circuit-switched network, an IP-based mobile multimedia core network, or another type of transport network. Mobile core network may include one or more packet processing nodes to support firewall, load balancing, billing, deep-packet inspection (DPI), and other services for mobile traffic traversing the mobile core network.

The IMS voice core 107 may include a Call Session Control Function (CSCF) (not shown) and a Home Subscriber Server (HSS) (not shown). The CSCF is implemented via servers using the SIP protocol to communicate with each other and application servers. The HSS plays the role of a location server in IMS and also serves as a repository for subscriber data. IMS voice core 107 facilitates the routing path for mobile originated or terminated session requests and is the most processing intensive node of the IMS core network.

Single video source 109 provides video content to users.

Video distribution core 111 is a video distribution system which enables transmission of a video signal through a transmission path In SDN 113 the control plane that implements important network routing and switching functionalities and the data forwarding plane are decoupled. The control plane can be logically centralized and implemented with a variety of hardware components of varied architectures. The data plane may utilize inexpensive and simplified network switches or routers configurable by SDN controller 114 as a result.

The core cloud 101 communicates with HFC Network 114, which include an IP POP Optical node 115 and an SDN control agent (SDN CA 117).

IP POP Optical Node 115 translates the signal from a light beam to radio frequency (RF), and sends it over coaxial cable lines for distribution to subscriber residences.

SDN CA 117 interacts with the control plane infrastructure, which oversees the overall network management. The SDN controller 114 communicates with the SDN CA 117 through communication interfaces over a data communications network (e.g., SDN). For instance, using a signal communication interface, the SDN controller communicates with the SDN CA 117 through TCP/IP connections. The SDN controller 114 receives communications from the SDN CA 117 of different remote network devices and gathers information concerning their respective local computing environment (e.g., hardware and/or software settings, including CPU capabilities, storage capabilities, resident operating system, etc.). In an embodiment SDN 113 and the SDN CA 117, hosted in the HFC network 114 interact via the IP POP optical node 115 that is also hosted in the HFC network 114. SDN CA 117 acts as an intelligent node for the shared HFC network 114 and the shared backhaul in support of the guaranteed QoS and the disaster recovery. SDN 113 performs its local action using SDN CA 117 located at the junction of deep fiber and HFC coax at the IP POP optical node 115. The SDN CA 117 and the SDN 113 are pre-provisioned with all the configuration and connectivity. The result is a specific implementation architecture of connecting network based core SDN 113 with a HFC located SDN CA 117 that allows local HFC access be smarter. This architecture leverages the all IP connection for central SDN 113 to interact with the SDN CA 117 residing in the HFC Network 114 deep fiber node. SDN CA 117 collects the health access related telemetries and sends them to SDN 113 for further processing and then sharing with SDN CA 117 for the local action. All the actions dictated by SDN 113 are executed at edge by the SDN CA 117. By pushing a certain level of control logic to the SDN CA 117 a network operator may provide a multi-fold reduction in failure reaction time compared to the "pure" (fully-centralized) OpenFlow system where the controller responds to all failures. The SDN CA 117 resides in HFC Network 114 with all IP infrastructure supporting QoS for the end users on demand.

HFC network 114 includes optical fiber 119 that connects a plurality of nodes for example node 121 which may be a commercial building, nodes 123, 125, 127, and 129 which may represent residences of network users. Nodes 125 and 127 may be provided with Wi-Fi devices 131 and 133. HFC Network 114 may include optical fiber 135 connecting macro cells 137, 139 and 141 with IP POP optical Node 115. Macro cell 141 may provide connection to 5G UE 143 (and a plurality of other UEs) and IoT device 145 (and plurality of other IoT devices). Optical fiber 119 may also connect small cells 147 and 149 and macro cell 151 with IP POP optical Node 115.

In an embodiment the architecture 100 provides a specific implementation architecture of connecting network based SDN 113 with a HFC located SDN CA 117 that allows local access to the HFC network 114 to be smarter. The architecture 100 leverages the all IP connection for SDN 113 to interact with the SDN CA 117 residing in an HFC deep fiber node. The architecture 100 provides deep fiber paved SDN penetration supporting the monitoring and managing of HFC network 114. SDN CA 117 collects the health access related telemetries and sends them to the central SDN 113 for further processing and then sharing with SDN CA 117 for the local action. All the action dictated by the SDN 113 is executed at edge by the SDN CA 117. The traffic is all IP all the way to the HFC node that facilitates the deep SDN architecture in order to achieve real time low latency and efficient services. In this architecture 100 there would be pre-stored and dynamically activated backup forwarding rules so as to deviate from controller instructions in response to rapid network changes. SDN CA 117 and central SDN 113 are pre-provisioned with all the configuration and connectivity. By pushing a certain level of control logic to the SDN CA 117 a multi-fold reduction in failure reaction time can be realized when compared to the "pure" (fully-centralized) OpenFlow system where the SDN controller 114 responds to all failures. The gains highly depend on the quality of the channel between the SDN controller 114 and the SDN CA 117. The SDN CA 117 resides in an HFC network 114 with an all IP infrastructure supporting QoS for the end users on demand. The architecture 100 facilitates the use of the same deep fiber densification infrastructure to off load HFC traffic too whenever needed under the guidance of deep SDN.

Figure 2:
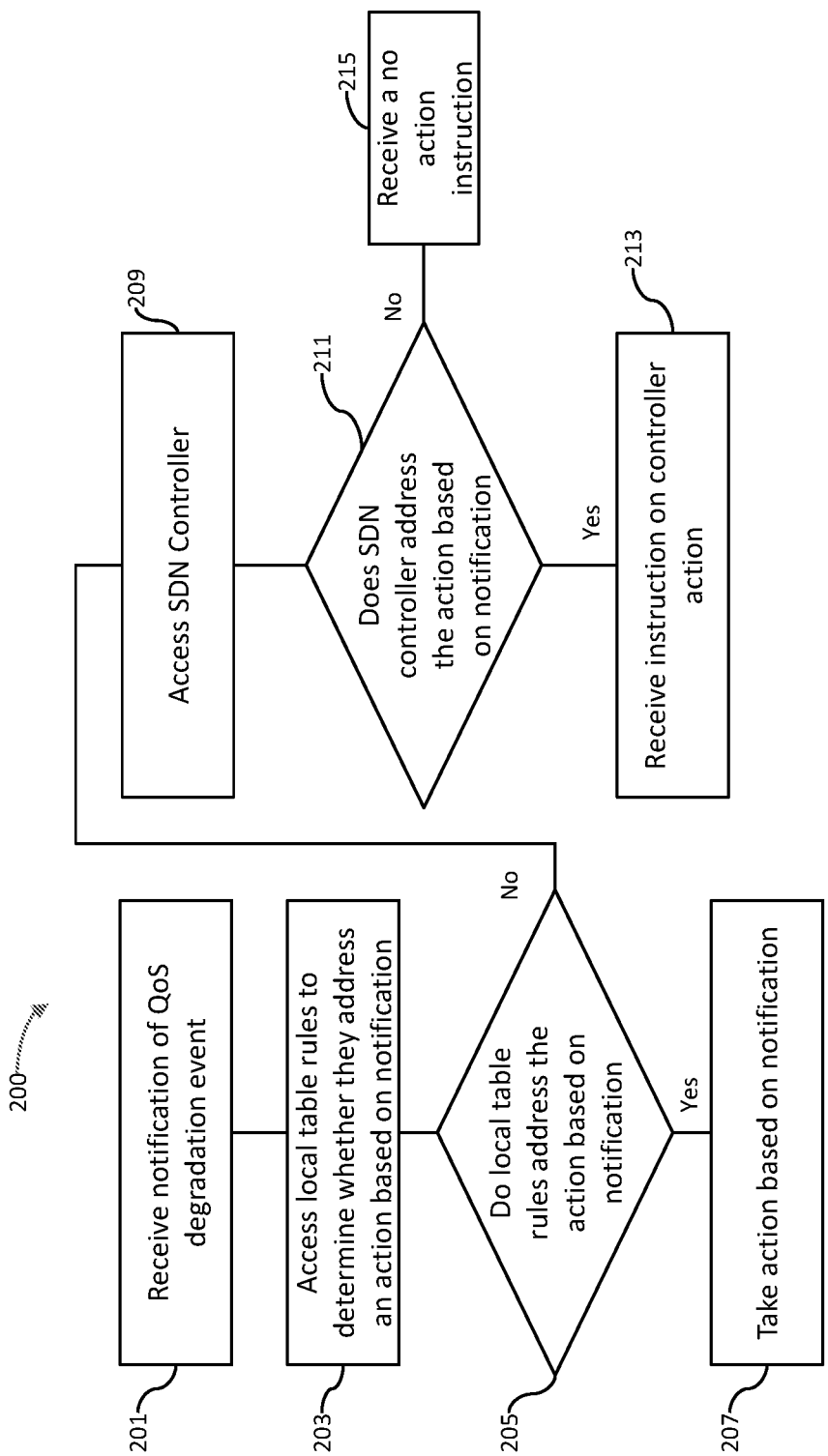
FIG. 2 is a flowchart of a method for leveraging deep fiber densification.

Illustrated in FIG. 2 is a flowchart for a method 200 for leveraging deep fiber densification.

In step 201, the method 200 receives at the SDN CA 117 a message notification from the HFC deep fiber densification region of a QoS degradation event. An example of a QoS degradation event may be bandwidth starvation (insufficient bandwidth to transmit voice and/or video data without undue delay, or interruption) for a particular group of end users.

In step 203, the method 200 accesses pre-populated local table rules stored in the SDN CA 117.

In step 205, the method 200 determines whether the local table rules identify an action for the SDN CA 117 to take in response to the message notification.

In step 207, the method 200 initiates an action if the local table rules identify the action that the SDN CA 117 should take in response to the notification. Example of an action may be routing the traffic, by handing off from HFC cable by leveraging Wi-Fi to the wireless RAN, which in turn routes the traffic via wireless or cable backhaul to the core of the service. When QoS degradation in HFC network or any failure in backhaul for any specific house segment supported by the cable infrastructure is detected, SDN 113 will redirect the traffic from any specific smart home equipped with Wi-Fi to core cloud 101 via cellular network. The method 200 will use the same infrastructure to off load HFC traffic whenever needed under the guidance of deep SDN.

In step 209, if the local table rules do not address the action that the SDN CA 117 should take in response to the notification, the method 200 accesses the SDN controller 114 for improved intelligent processing.

In step 211 the method 200 determines whether the SDN controller 114 identified a controller action to take in response to the notification.

In step 213, if the SDN controller 114 identifies a controller action to take in response to the notification, then the SDN CA 117 receives instructions on what action to take.

In step 215, if the SDN controller 114 does not identify a controller action to take in response to the notification, then the SDN CA 117 may receive a no action instruction or no instruction.

When QoS degradation in HFC network 114 or any failure in backhaul for any specific house segment supported by the cable infrastructure is detected, SDN 113 will redirect the traffic from any specific smart home equipped with Wi-Fi to distribution core via cellular network. Thus, the deep fiber densification that was primarily for wider wireless access, like 5G RAN, can be used to off load HFC traffic to where needed under the guidance of deep SDN.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method comprising:
receiving, at a software defined network (SDN) control agent, a notification of a quality of service (QoS) degradation event;
accessing local table rules stored in the SDN control agent to determine whether the local table rules identify a first action to take in response to the notification;
if the local table rules identify the first action to take in response to the notification, then taking the first action;
if the local table rules do not identify the first action to take in response to the notification, then accessing an SDN controller through an internet protocol (IP) point of presence (POP) optical node to determine whether the SDN controller identifies a second action to take in response to the notification; and
when the SDN controller identifies the second action to take, receiving instruction to implement the second action.

2. The method of claim 1 further comprising redirecting traffic through a hybrid fiber coaxial (HFC) network to a radio access network using Wi-Fi.

3. The method of claim 1 wherein the QoS degradation event is bandwidth starvation.

4. The method of claim 1 wherein the QoS degradation event is packet loss.

5. The method of claim 1 wherein the SDN controller is disposed in an SDN network in a core network.

6. The method of claim 1 wherein the SDN remote control agent resides in a network element disposed in the HFC network.

7. A system comprising:
one or more processors; and
memory coupled with the one or more processors, the memory storing executable instructions that when executed by the one or more processors cause the one or more processors to effectuate operations comprising:
receiving, at a software defined network (SDN) control agent a notification of a quality of service (QoS) degradation event;
accessing local table rules stored in the SDN control agent to determine whether the local table rules identify a first action to take in response to the notification;
if the local table rules identify the first action to take in response to the notification, then taking the first action;
if the local table rules do not identify the first action to take in response to the notification, then accessing an SDN controller through an internet protocol (IP) point of presence (POP) optical node to determine whether the SDN controller identifies a second action to take in response to the notification; and
when the SDN controller identifies the second action to take, receiving instruction to implement the second action.

8. The system of claim 7 further comprising redirecting traffic through a hybrid fiber coaxial (HFC) network to a radio access network using Wi-Fi.

9. The system of claim 7 wherein the QoS degradation event is bandwidth starvation.

10. The system of claim 7 wherein the QoS degradation event is packet loss.

11. The system of claim 7 wherein the SDN controller is disposed in an SDN in a core network.

12. The system of claim 7 wherein the remote control agent resides in a network element disposed in a hybrid fiber coaxial (HFC) network.

13. A non-transitory, tangible computer-readable medium having computer-executable instructions stored thereon which, when executed by a computer, cause the computer to perform a method comprising:
receiving, at a software defined network (SDN) control agent, a notification of a quality of service (QoS) degradation event;
accessing local table rules stored in the SDN control agent to determine whether the local table rules identify a first action to take in response to the notification;
if the local table rules identify the first action to take in response to the notification, then taking the first action;
if the local table rules do not identify the first action to take in response to the notification, then accessing an SDN controller through an internet protocol (IP) point of presence (POP) optical node to determine whether the SDN controller identifies a second action to take in response to the notification; and
when the SDN controller identifies the second action to take, receiving instruction to implement the second action.

14. The non-transitory, tangible computer-readable medium of claim 13 wherein the method performed by the computer-executable instructions which further comprises redirecting traffic through a hybrid fiber coaxial (HFC) network to a radio access network using Wi-Fi.

15. The non-transitory, tangible computer-readable medium of claim 13 wherein the QoS degradation event is bandwidth starvation.

16. The non-transitory, tangible computer-readable medium of claim 13 wherein the QoS degradation event is packet loss.

17. The non-transitory, tangible computer-readable medium of claim 13 wherein the SDN controller is disposed in an SDN in a core network.

* * * * *